United States Patent
Briant et al.

(10) Patent No.: US 6,294,889 B1
(45) Date of Patent: Sep. 25, 2001

(54) PROCESS AND A CONTROL DEVICE FOR A MOTOR OUTPUT SUITABLE FOR BEING CONTROLLED THROUGH A COMMUNICATION BUS

(75) Inventors: Joseph Briant, Marly le Roy; André Ganier, Chatou; Alain Gerard, Le Perreux, all of (FR)

(73) Assignee: Schneider Electric SA, Boulogne Billancourt (FR)

( * ) Notice: Subject to any disclaimer, the term of this patent is extended or adjusted under 35 U.S.C. 154(b) by 0 days.

(21) Appl. No.: 09/070,722

(22) Filed: May 1, 1998

(30) Foreign Application Priority Data

May 9, 1997 (FR) .................................................. 97 05800

(51) Int. Cl.⁷ .................................................. G05B 19/29
(52) U.S. Cl. ............................ 318/473; 318/16; 318/600; 706/916
(58) Field of Search ..................... 318/473, 472, 318/798, 778, 806, 779, 16, 6, 7, 8, 434, 600; 361/20–33, 93, 94; 364/926.5, 926.9, DIG. 2; 370/449, 94.1, 475, 99, 85.1; 340/825.08; 706/904, 908, 28, 916

(56) References Cited

U.S. PATENT DOCUMENTS

| | | | |
|---|---|---|---|
| 4,939,437 | * | 7/1990 | Farag et al. ............................ 318/473 |
| 5,206,572 | * | 4/1993 | Farag et al. ............................ 318/778 |
| 5,386,183 | * | 1/1995 | Cronvich et al. ...................... 318/434 |
| 5,493,468 | * | 2/1996 | Hunter et al. ............................ 361/31 |
| 5,506,485 | * | 4/1996 | Mueller et al. ........................ 318/600 |
| 5,721,737 | * | 2/1998 | Radjabi et al. ........................ 370/449 |

FOREIGN PATENT DOCUMENTS 0 736 946 A1  10/1996 (EP).
2 208 553 A   4/1989 (GB).

* cited by examiner

Primary Examiner—Paul Ip
(74) Attorney, Agent, or Firm—Oblon, Spivak, McClelland, Maier & Neustadt, P.C.

(57) ABSTRACT

This invention relates to a control device for a motor output (DM) comprising electrical control and protection switchgear (CD) for a motor (M) receiving contact information (a1, a2, a3) connected to the electrical switchgear (CD) and its output controlling at least one control device (KM) that controls starting or stopping the motor (M) and also receiving information from a remote sensor (C) and communicating with a "master" network controller (PLC) through a communication bus (B), characterized by the fact that the electronics (E) comprises means of locally controlling the control device (KM) stopping the motor (M) as soon as the remote sensor (C) is activated during an operating phase of the motor output and means of sending information corresponding to this stop on the bus (B) to the "master" module (PLC).

9 Claims, 3 Drawing Sheets

PROCESS AND A CONTROL DEVICE FOR A MOTOR OUTPUT SUITABLE FOR BEING CONTROLLED THROUGH A COMMUNICATION BUS

BACKGROUND OF THE INVENTION

1. Field of the Invention

This invention relates to a process and a control device for a motor output suitable for being controlled through a communication bus and capable of informing a supply side network controller through this bus.

2. Discussion of the Background

The architecture of a low level communication bus (factory bus) usually includes a network controller that is called the "master", and sensors and/or actuators that are called "slaves". This "master" module and these "slave" modules are connected together through a communication support (pair of conducting wires, coaxial cable, optical fiber, carrier current, etc.) which carry information and possibly the power supply for slaves.

The "slave" module may be a motor output, of which there are several types (direct starter, starter with reversed direction of motion, star-delta starter, progressive starter). This type of motor output consists in an electrical switchgear that partially or completely carries out control functions (contactor, static control) and motor protection functions (circuit breaking, magnetic protection, temperature protection, phase unbalance). One or two "on-off" sensors may be connected directly to this motor output if the application needs them. Electronics locally manage all module components and communication on the bus.

The "master" module sends motor output orders (forward motion command, reverse motion command, stop command) through the communication bus. The motor output executes these commands and returns relevant information (moving, stopped, in fault, etc.), together with the state of its remote "on-off" sensors, through this bus. Patent FR 2 732 523 describes a motor output connected to an AS-I (abbreviation for Actuator Sensor Interface) type communication bus.

We will now consider the example of an automation system composed of a conveyer belt, the motor of which is controlled by an actuator connected to the communication bus. In motion, the master is informed through the bus when a part is detected by a remote "on-off" sensor. It must then return a stop order to this actuator in order to stop the belt. The time interval between when the sensor is activated and the time at which the motor output executes the stop order depends on the various points through which the information passes and the master software cycle and processing times. It also, to a lesser degree, depends on the time to distribute the sensor information on the bus and for the master to distribute the stop command. Therefore the system reaction time is highly variable.

SUMMARY OF THE INVENTION

The purpose of the invention is to provide a motor output capable of locally managing information from the remote sensor and immediately stopping the motor and informing the master, through the communication bus. This motor output can immediately stop the motor controlled by it, after a local sensor reacts following the event.

The control process according to the invention is applicable to a motor output comprising electrical switchgear for control and protection of a motor plus electronics receiving contact information related to the electrical switchgear and controlling at least one control device at the output to control starting or stopping the motor (M) and also receiving information from a remote sensor and communicating with a "Master" network controller through a communication bus, and it is characterized in that it consists in locally controlling the device that stops the motor as soon as the remote sensor is activated while the motor output is in the operating phase and sending information corresponding to this stop on the bus to the master module.

According to another characteristic, the process consists in the master module sending confirmation of the stop through the bus to the electronics that enables it to be unlocked.

According to another characteristic, the process consists in controlling operation of the motor when the electronics receives a start order from the master module, and then deactivating the sensor.

The control device according to the invention comprises electrical motor control and protection switchgear plus electronics receiving contact information related to the electrical switchgear and having an output controlling at least one control device that controls starting or stopping the motor and also receiving information from a remote sensor and communicating with a "master" network controller through a communication bus, and it is characterized in that the electronics comprises means of locally controlling the motor stop control device as soon as the remote sensor is activated during an operating phase of the motor output and means of sending information corresponding to this step on the bus to the master module.

BRIEF DESCRIPTION OF THE DRAWINGS

An embodiment of the invention will now be described in more detail as an example, represented by the attached drawings in which.

DESCRIPTION OF THE PREFERRED EMBODIMENTS

The device according to the invention controls a three-phase electrical motor M powered by a three-phase line L1, L2, L3.

A communication bus B connects a PLC network controller called the "master" to at least one DM motor output module called a "slave" and transfers control and information signals between components connected to this bus.

The DM motor output comprises a box containing an electrical switchgear CD performing control and protection functions for motor M. This switchgear CD is connected to the three-phase line L1, L2, L3 through connection terminals 1, 3, 5, and to motor M through terminals 2, 4, 6. For example, the switchgear CD is composed of a circuit breaker-motor D associated with the contactor KM. The motor output also comprises an electronic interface E in the box used for management of the electrical switchgear and communication on bus B.

An "On-Off" sensor C is connected directly to the motor output module DM to receive its power supply from it and to supply its state to the motor output module.

The electronics E monitors the state of the electrical switchgear of the motor protection D at the application end using auxiliary contacts a1 and a2 through logical input signals e1 and e2. The electronics E controls the electronic control switchgear KM for the motor, through the logical output signal s1. In return, the electronics E verifies the state of the switchgear KM using auxiliary contact a3 through a logical input signal e3. The state of the sensor C is monitored through the logical input signal e4.

At the network end, the electronics E receives frames through communication bus B containing orders from the PLC master module. It decodes them and generates a control signal s1 for KM. The electronics E also encodes and then transmits the states of the motor output and its associated sensor on bus B through e1, e2, e3 and e4.

Figure 1:
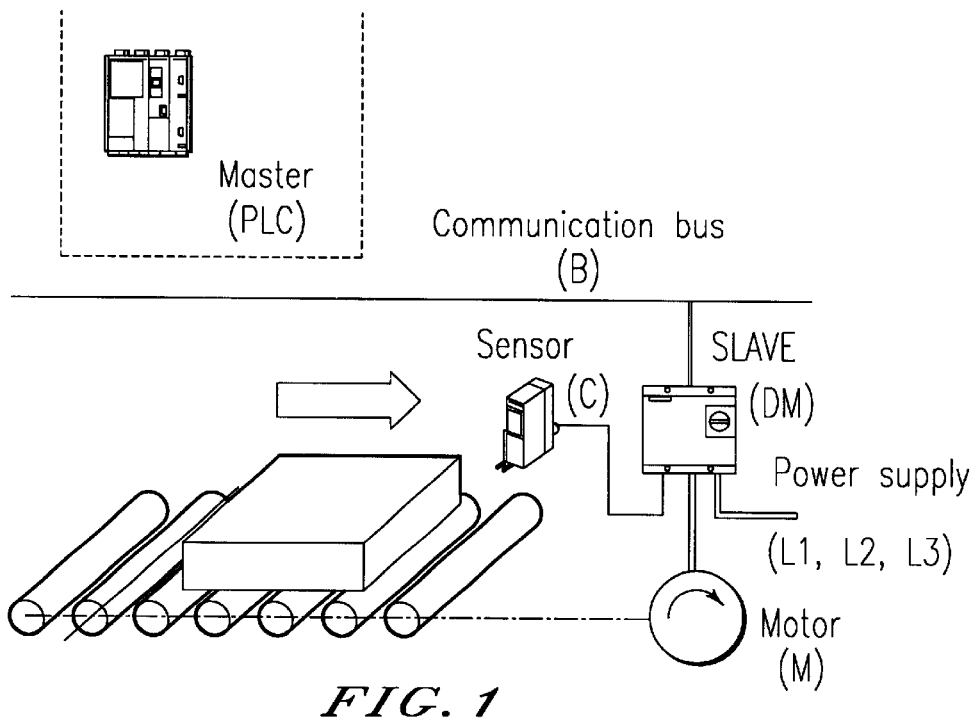
FIG. 1 is a diagram of an installation comprising a motor output module according to the invention.
Figure 2:
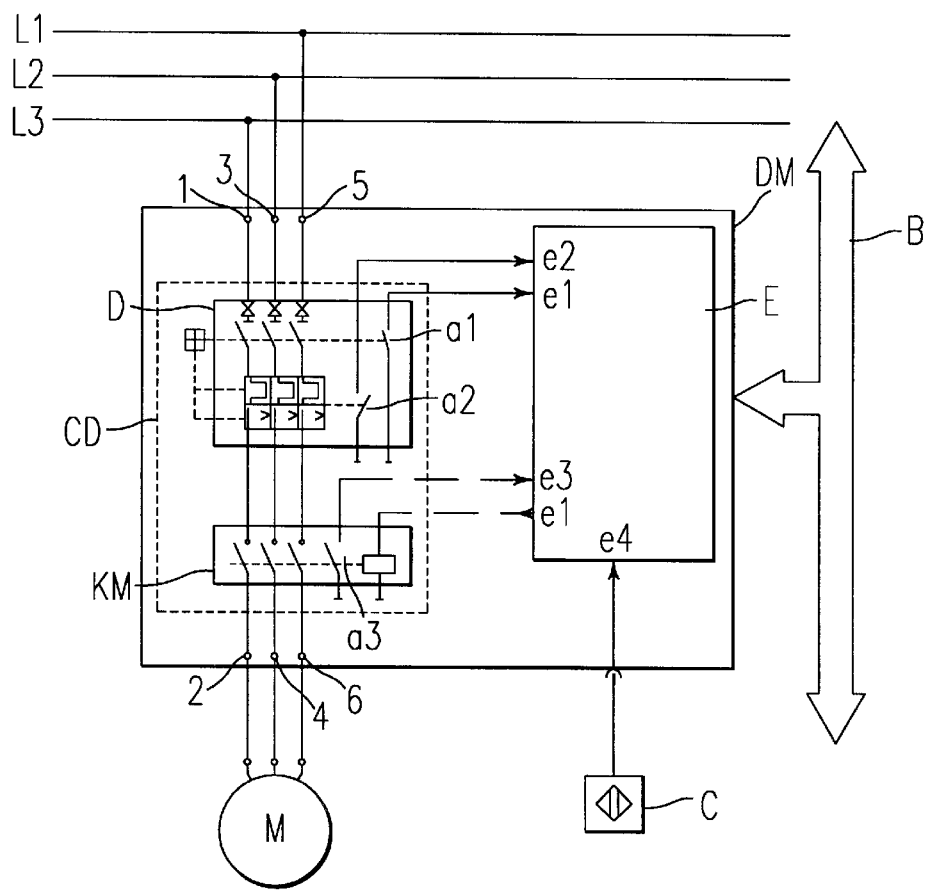
FIG. 2 is a functional diagram of the module.
Figure 3:
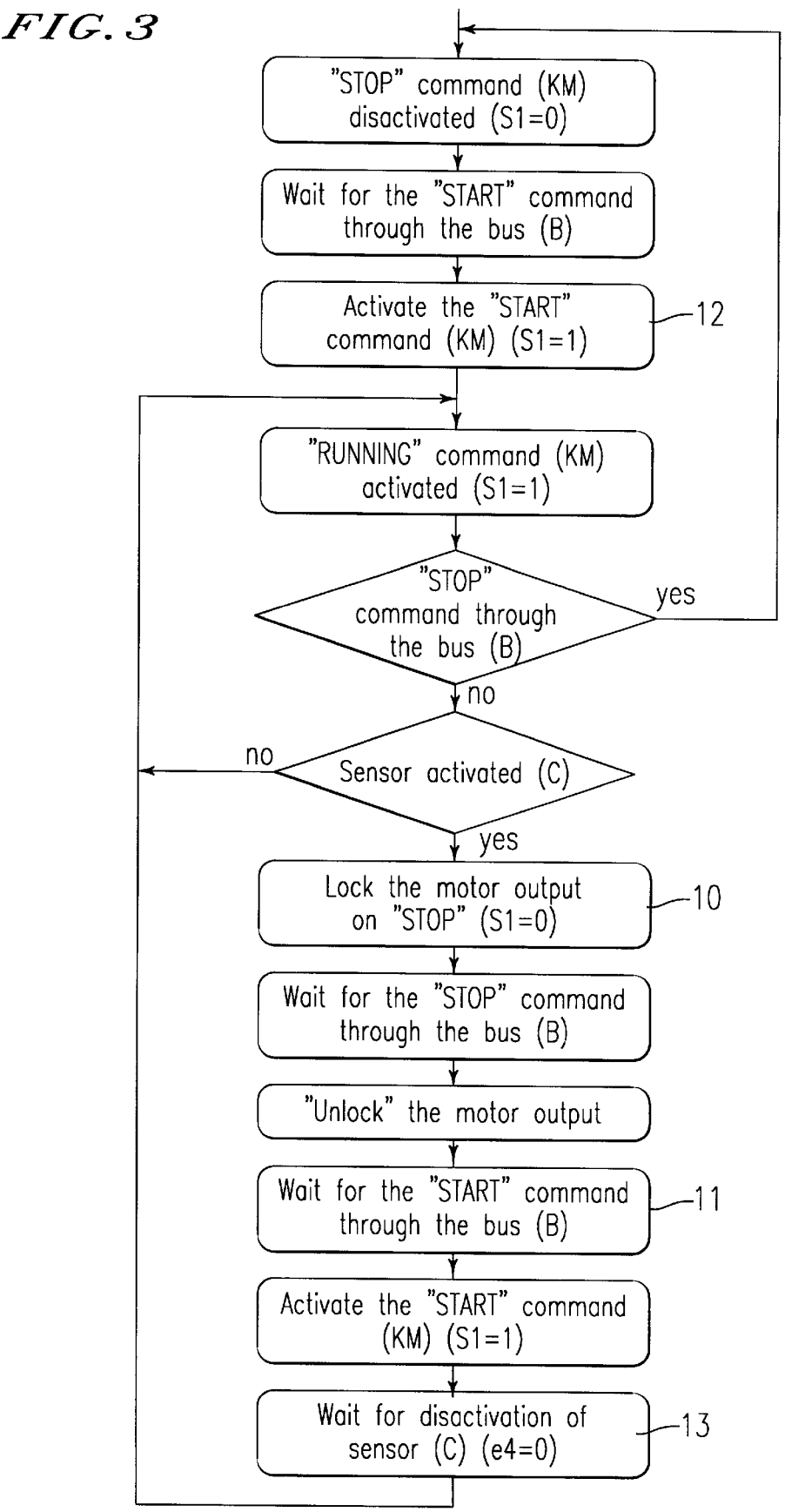
FIG. 3 is a simplified functional diagram carrying out the local processing function of information from a remote sensor.
Figure 4:
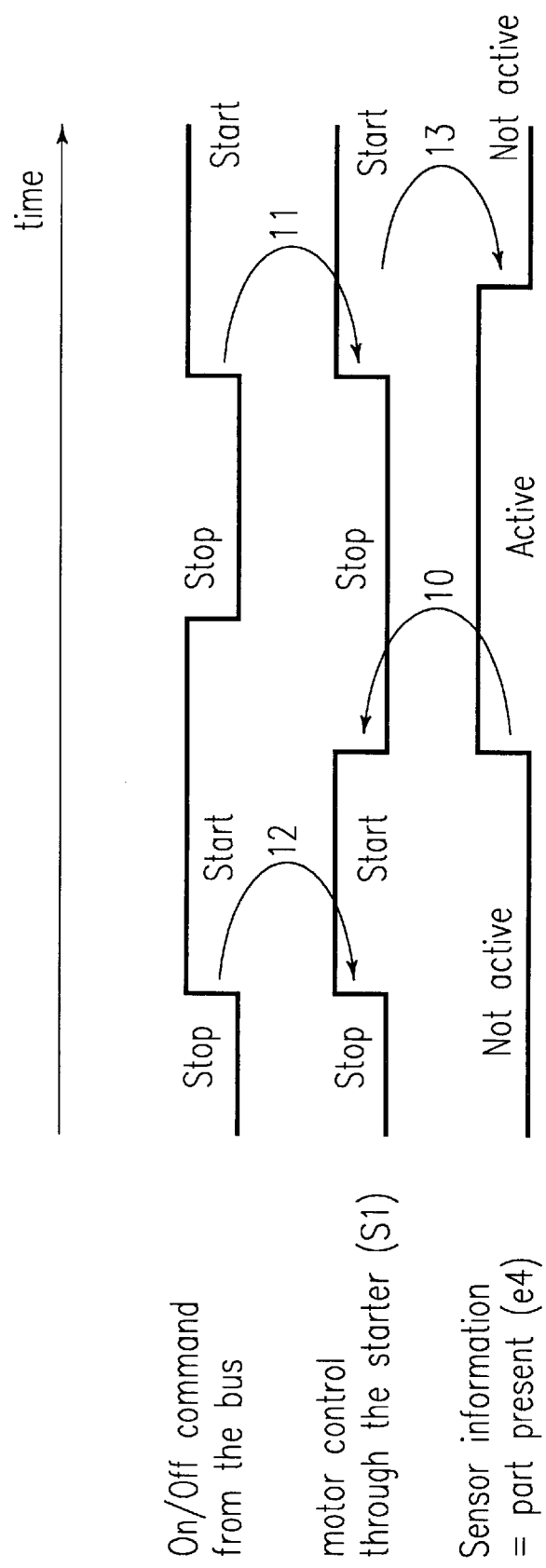
FIG. 4 is a timer diagram illustrating operation of the module.

This electronics E operates according to the functional diagram in FIG. 3. The states of sensor C and the states of the motor output DM are continuously available for the communication management algorithm.

When the electronics E detects a Start order (step 12) from bus B, it controls operation of the motor through control device KM.

If the electronics E detects that sensor C is activated (during the motor output Operation phase) during step 10, it immediately stops the motor through the motor control device KM. The electronics E also transmits a frame on bus B to the PLC master module containing information corresponding to this stop. The motor output module DM is then locked in the stopped state.

The stop command is then confirmed (step 14) by the PLC master module, through bus B, to electronics E that enables it to be unlocked.

When the electronics E receives a start order (step 11) from the PLC master module, it controls motor operation through device KM. The sensor C is then disactivated (step 13).

Obviously, it would be possible to consider variants and improvements to detail, and even to envisage the use of equivalent means, without going outside the framework of the invention.

What is claimed is:

1. A process for controlling a motor, comprising:
   locally controlling starting and stopping of a motor using a local control device remotely connected to a master controller;
   monitoring said motor with a sensor which can be activated by an information condition of an automation system;
   stopping the motor using the local control device when information from the sensor is received by the local control device indicating that the sensor is in an activated state;
   stopping said local control device when the sensor is activated by the automation system;
   sending stop information from the local control device to said master controller indicating the motor has stopped;
   sending a command from the master controller, after receipt of the stop information, to the local controller for the local controller to unlock the local control device controlling the motor; and
   sending a start command from the master controller to the local controller to start the motor and switching the sensor out of the activated state after sending the start command.

2. A process as recited in claim 1, comprising:
   stopping said motor as soon as possible when the information from the sensor is received by the local control device indicating that the sensor is in the activated state.

3. A process as recited in claim 1, comprising:
   controlling starting and stopping of the motor using switch equipment located between a power source for the motor and the motor;
   stopping the motor using the switch equipment; and
   waiting for the sensor to be switched out of the activated state; and
   starting the motor after the waiting step.

4. A device for controlling a motor connected to a power source, comprising:
   a local controller having a switching device adapted to be connected between the motor and the power supply;
   electronics connected to said switching device and via a bus to a master controller;
   wherein said electronics is adapted to receive input from a sensor monitoring said motor and from said switching device and monitor said switching device via an output in order to stop said motor and switching device upon receipt from said sensor of input indicating said sensor is in an active state, and to send information to said master controller located remote from said local controller indicating said motor is stopped and receive stop information from said master controller confirming said motor is stopped that enables said motor to be unlocked and to control said motor when it receives start information.

5. A device as recited in claim 4, wherein:
   said switching device comprises a motor circuit breaker associated with a contactor.

6. A device as recited in claim 4, wherein said electronics is adapted to stop said motor as soon as possible when said input from said sensor is received indicating that said sensor is in said active state.

7. A device for controlling a motor connected to a power source, comprising:
   a local controller controlling a switching device adapted to be connected between the motor and the power supply; and
   electronics connected to said switch and comprising:
   means for receiving input from a sensor monitoring said motor and from the switching device;
   means for outputting to activate the switching device so as to stop said motor upon receipt from said sensor of input indicating said sensor is in an active state;
   means for sending information to a master controller located remote from said local controller indicating said motor is stopped;
   means for receiving stop information from said master controller confirming said motor is stopped;
   means for unlocking said motor after receiving said stop information; and
   means for starting said motor after receiving start information and input from said sensor indicating said sensor is not in said active state.

8. A device as recited in claim 7, wherein:
   said means for stopping said motor and placing said motor in a locked condition comprises a motor circuit breaker associated with a contactor.

9. A device as recited in claim 7, wherein said electronics comprises:
   means for stopping said motor as soon as possible when said input from said sensor is received indicating that said sensor is in said active state.

* * * * *